United States Patent
Kim et al.

(10) Patent No.: US 12,339,574 B2
(45) Date of Patent: Jun. 24, 2025

(54) POLARIZATION-DEPENDENT LIGHT STEERING APPARATUS-BASED WIDE PROJECTION DISPLAY SYSTEM

(71) Applicant: Kyungpook National University Industry-Academic Cooperation Foundation, Daegu (KR)

(72) Inventors: Hak-Rin Kim, Daegu (KR); Min-Kyu Park, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 682 days.

(21) Appl. No.: 17/315,001

(22) PCT Filed: Nov. 8, 2019

(86) PCT No.: PCT/KR2019/015187
§ 371 (c)(1),
(2) Date: Dec. 19, 2022

(87) PCT Pub. No.: WO2020/096422
PCT Pub. Date: May 14, 2020

(65) Prior Publication Data
US 2023/0229070 A1     Jul. 20, 2023

(30) Foreign Application Priority Data

Nov. 8, 2018 (KR) .................. 10-2018-0136624

(51) Int. Cl.
*G03B 21/20* (2006.01)
*G03B 21/14* (2006.01)
*G03B 21/56* (2006.01)

(52) U.S. Cl.
CPC ....... *G03B 21/2073* (2013.01); *G03B 21/142* (2013.01); *G03B 21/56* (2013.01)

(58) Field of Classification Search
CPC ........ G03B 21/14; G03B 21/20; G03B 21/56; G03B 21/142; G03B 21/208;
(Continued)

(56) References Cited

U.S. PATENT DOCUMENTS

| | | |
|---|---|---|
| 5,134,516 A | 7/1992 | Lehureau et al. |
| 5,206,673 A | 4/1993 | Kawahara et al. |

(Continued)

FOREIGN PATENT DOCUMENTS

| | | |
|---|---|---|
| CN | 1117633 A | 2/1996 |
| JP | 2001318374 A | 11/2001 |

(Continued)

OTHER PUBLICATIONS

PCT/IB/326 Notification Concerning Transmittal of International Preliminary Report on Patentability for related International Application No. PCT/KR2019/015187, mailed on May 20, 2021 (1 page).

(Continued)

*Primary Examiner* — Sultan Chowdhury
(74) *Attorney, Agent, or Firm* — Procopio, Cory, Hargreaves & Savitch LLP

(57) ABSTRACT

Disclosed is a polarization-dependent light steering device based wide projection display system which can extend the screen projection region of an image at low cost without lowering of resolution. A wide projection display system according to an embodiment of the present invention comprises: a projector for sequentially outputting, in a time division scheme, images to be projected to different regions on a screen; and a light steering device installed behind the projector to differently control the output directions of the images according to the polarization directions of the images. The light steering device comprises a plurality of Fresnel prism arrays having polarization dependence. The (Continued)

plurality of Fresnel prism arrays are stacked along the projection direction of images output from the projector.

16 Claims, 21 Drawing Sheets

(58) Field of Classification Search
CPC .............. G03B 21/604; G03B 21/2013; G03B 21/2053; G03B 21/2073; H04N 9/31; H04N 9/47; H04N 9/315; H04N 9/3105; H04N 9/3102; H04N 9/3111; H04N 9/3123; H04N 9/3167; H04N 9/3179
See application file for complete search history.

(56) References Cited

U.S. PATENT DOCUMENTS

| 6,621,533 | B2 | 9/2003 | Slack et al. | |
|---|---|---|---|---|
| 2002/0093718 | A1* | 7/2002 | Slack | G02B 5/3083 |
| | | | | 359/251 |
| 2005/0018286 | A1* | 1/2005 | Yoon | G03B 21/602 |
| | | | | 348/E5.143 |
| 2006/0061860 | A1* | 3/2006 | Devos | G03B 21/56 |
| | | | | 359/443 |
| 2006/0291243 | A1* | 12/2006 | Niioka | F21V 33/0052 |
| | | | | 362/606 |
| 2007/0279736 | A1* | 12/2007 | Endo | G03B 21/62 |
| | | | | 359/460 |
| 2011/0242461 | A1* | 10/2011 | Escuti | H04N 9/3167 |
| | | | | 349/96 |
| 2014/0192329 | A1* | 7/2014 | Shin | G03B 35/20 |
| | | | | 353/30 |

FOREIGN PATENT DOCUMENTS

| JP | 2004279847 A | 10/2004 |
|---|---|---|
| JP | 2007-322820 A | 12/2007 |
| KR | 20-0252576 Y1 | 11/2001 |
| KR | 10-0621495 B1 | 9/2006 |
| KR | 10-2010-0053922 A | 5/2010 |
| KR | 1020140050129 A | 4/2014 |
| WO | 97/01779 A1 | 1/1997 |

OTHER PUBLICATIONS

PCT/IB/338 Notification of Transmittal of Translation of the International Preliminary Report on Patentability for related International Application No. PCT/KR2019/015187, mailed on May 20, 2021 (1 page).
PCT/IB/373 International Preliminary Report on Patentability with Korean-language PCT/ISA/237 Written Opinion of the International Searching Authority for related International Application No. PCT/KR2019/015187, mailed on May 11, 2021 (8 pages).
International Search Reporting and Written Opinion for related International Application No. PCT/KR2019/015187, mailed on Feb. 27, 2020; English translation of ISR provided.

* cited by examiner

POLARIZATION-DEPENDENT LIGHT STEERING APPARATUS-BASED WIDE PROJECTION DISPLAY SYSTEM

FIELD OF THE INVENTION

The present disclosure relates to a polarization-dependent light steering device based wide projection display system. More specifically, the present disclosure relates to a wide projection display system which can extend the screen projection region of an image without lowering of resolution.

BACKGROUND

Various projection display systems are being used in virtual reality experience centers, movie theaters and the like. The projection display system displays an image on the screen by projecting an image onto a screen by a projector. When an image needs to be projected on a large-screen such as in a large-screen movie theater, an image can be enlarged and projected on the screen by increasing the distance between the projector and the screen, and the size of the image on the screen can be increased. However, increasing the distance between the projector and the screen results in lowering resolution. Since two or more projectors must be used to increase the screen size without lowering the resolution, installation and operation costs increase in proportion to the number of projectors used.

DETAILED DESCRIPTION OF THE INVENTION

Problems to be Solved

The present disclosure is directed to providing to a polarization-dependent light steering device based wide projection display system, which can extend the screen projection region of an image at low cost without lowering of resolution.

The problem to be solved by the present disclosure is not limited to the problem mentioned above. Other technical problems not mentioned will be clearly understood by those of ordinary skilled in the art from the following description.

TECHNICAL SOLUTION TO SOVE THE PROBLEMS

An exemplary embodiment of the present disclosure provides a wide projection display system comprising: a projector that sequentially outputs images to be projected on different regions of a screen in a time division scheme; and a light steering device installed at the rear of the projector and controlling output directions of the images differently according to polarization directions of the images. The light steering device comprises a plurality of Fresnel prism arrays having polarization dependence. The plurality of Fresnel prism arrays are stacked along a projection direction of images output from the projector.

The Fresnel prism array may comprise a prism array and a liquid crystal polymer layer on the prism array.

In an embodiment, the plurality of Fresnel prism arrays may comprise a first and a second Fresnel prism arrays stacked along a projection direction of the images. The first and second Fresnel prism arrays may have liquid crystal alignment directions of the liquid crystal polymer layer perpendicular to each other.

The first Fresnel prism array may passe a first image polarized in a first polarization direction of the images without deflecting, and the second Fresnel prism array may deflect the first image toward a first region of the screen.

The first Fresnel prism array may deflect a second image polarized in a second polarization direction perpendicular to the first direction of the images toward a second region of the screen, and the second Fresnel prism array may pass the second image without deflecting.

The first region and the second region may be regions that are not spaced apart from each other and are not overlapped with each other. The first region may be a left region of the screen, and the second region may be a right region of the screen.

In another embodiment, the first and second Fresnel prism arrays may have liquid crystal alignment directions of the liquid crystal polymer layer parallel to each other. The light steering device may further comprise a half-wave plate between the first and second Fresnel prism arrays. The half-wave plate may change the polarization direction of the images by 90°.

The light steering device may comprise: a first polarization control layer for selectively changing a polarization direction of the images by 90° according to a first control signal; a first Fresnel prism array stacked on the first polarization control layer and controlling a projection direction of the images according to the polarization direction of the images; a second polarization control layer stacked on the first Fresnel prism array and selectively changing a polarization direction of the images by 90° according to a second control signal; and a second Fresnel prism array stacked on the second polarization control layer and controlling a projection direction of the images according to the polarization direction of the images.

The first polarization control layer and the second polarization control layer may comprise a liquid crystal layer in which liquid crystal alignment is changed by an electric field.

A first image of the images is deflected in a first direction by the second Fresnel prism array and is projected on the left region of the screen, and a second image of the images is deflected in the second direction by the first Fresnel prism array and is projected on the right region of the screen, and a third of the images may be projected on the central region of the screen without defecting by the first and second Fresnel prism arrays. The left region, the right region, and the central region may be regions that are not spaced apart from each other and are not overlapped with each other.

The wide projection display system according to an embodiment of the present disclosure further comprises: an analysis unit for analyzing an overlapping region of images projected on the screen by the light steering device or a separation distance between images projected on the screen; and a screen driving unit for controlling the position of the screen according to the size of the overlapping region or the separation distance.

The wide projection display system according to an embodiment of the present disclosure may further comprise a first driving unit for controlling the orientation of the light steering device with respect to the projection direction of the images output from the projector. The first driving unit may control the orientation of the light steering device so that images projected on the screen by the light steering device are not spaced apart from each other and are not overlapped with each other.

The wide projection display system according to an embodiment of the present disclosure may further comprise a second driving unit for controlling an angle between the first and second Fresnel prism arrays. The second driving unit may control an angle between the first and second Fresnel prism arrays so that images projected on the screen by the light steering device are not spaced apart from each other and overlapped with each other.

ADVANTAGES OF THE INVENTIONS

According to an embodiment of the present disclosure, provided is a polarization-dependent light steering device based wide projection display system which can extend a screen projection region of an image at low cost using a single projector without lowering the resolution.

According to an embodiment of the present disclosure, provided is a wide projection display system which can increase the size of a screen by two or three times or more while maintaining the resolution of an existing projection display.

The effects of the present disclosure are not limited to the aforementioned effects. Effects not mentioned herein will be clearly understood by those of skilled in the art from the present specification and the accompanying drawings.

DETAILED DESCRIPTION

Figure 1:
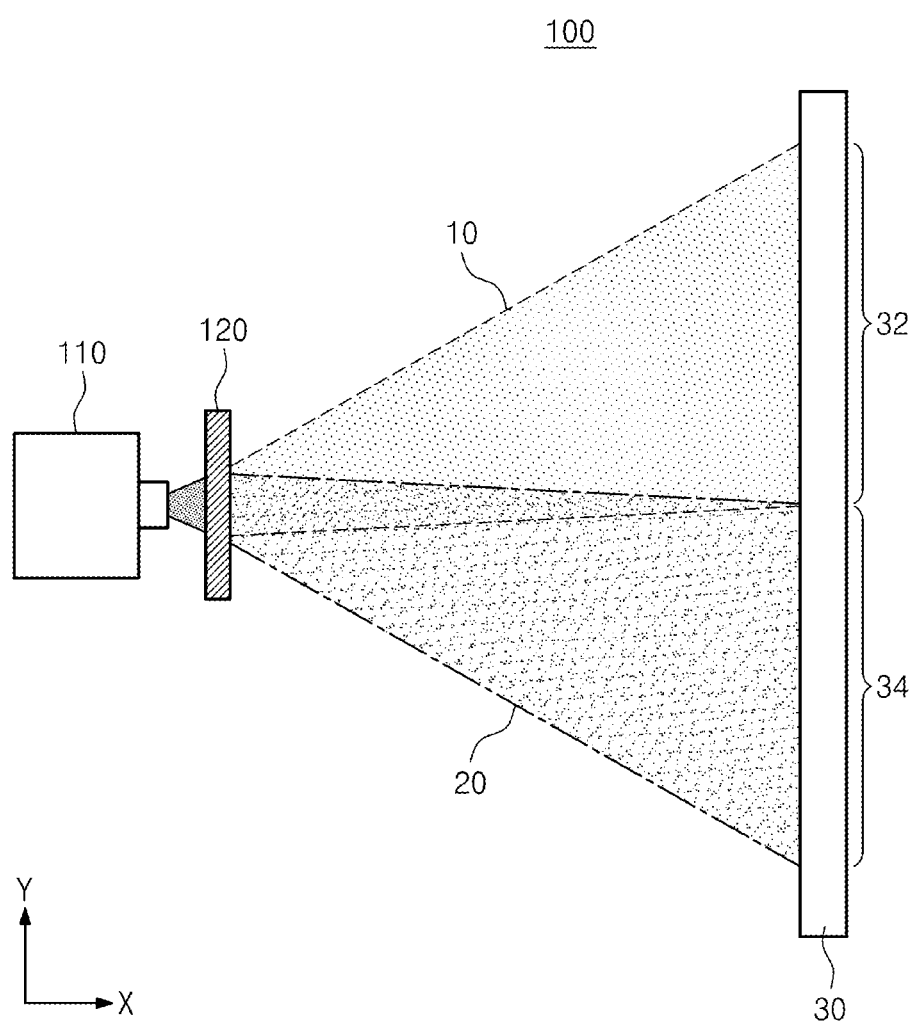
FIG. 1 is a schematic view of a wide projection display system according to an embodiment of the present disclosure.

Advantages and features of the present invention, and a method of achieving them will become apparent with reference to the embodiments to be described later in detail together with the accompanying drawings. However, the present disclosure is not limited to the embodiments disclosed below, but is only defined by the scope of the claims. Even if not defined, all terms (including technical or scientific terms) used herein have the same meaning as commonly accepted by universal techniques in the prior art to which this disclosure belongs. The detailed description of known configurations incorporated herein may be omitted when it may obscure the subject matter of the present disclosure. In the drawings of the present disclosure, the same reference numerals are used as far as possible for the same or corresponding configurations. Some configurations of the drawings may be exaggerated or reduced to help understanding of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "have," "having," etc., when used in this specification, specify the presence of stated features, integers, steps, operations, elements, and/or components, but do not preclude the presence of addition of one or more other features, integers, steps, operations, elements, components, and/or groups thereof.

The present disclosure relates to a wide projection display system based on a polarization-dependent beam-steering device. FIG. 1 is a schematic view of a wide projection display system according to an embodiment of the present disclosure. Referring to FIG. 1, a wide projection display system 100 according to an embodiment of the present disclosure comprises a projector 110 and a light steering device 120. The projector 110, the light steering device 120 and a screen 30 are arranged along the X direction.

The projector 110 sequentially outputs images to be projected on different regions of the screen 30 in a time division scheme. Images output from the projector 110 in a time division scheme are sequentially input to the light steering device 120. Images output from the projector 110 in a time division scheme may be images divided from each image frame of successive image frames.

For example, a first image of the images may be an image of a left region of an image frame, and a second image may be an image of a right region of an image frame. As another example, the first image may be an image of an upper portion of the image frame, and the second image may be an image of a lower portion of the image frame. As another example, images may be provided as three or more images divided from an image frame.

The light steering device 120 is installed at the rear of the projector 110. The light steering device 120 controls the output directions of images differently according to the polarization directions of the images. In the example of FIG. 1, at a first point in time, the first image 10 output from the projector 110 at is projected on the first region 32 of the screen 30 by deflecting from the X direction to the first direction (for example, left direction) by the light steering device 120. At a second point in time the second image 20 output from the projector 110 is projected on the second region 34 of the screen 30 by deflecting from the X direction to the second direction (for example, right direction) by the light steering device 120. The first region 32 and the second region 34 of the screen 30 may be regions that are not spaced apart from each other and are not overlapped with each other. The first region 32 may be a left region of the screen 30, and the second region 34 may be a right region of the screen 30.

Figure 2:
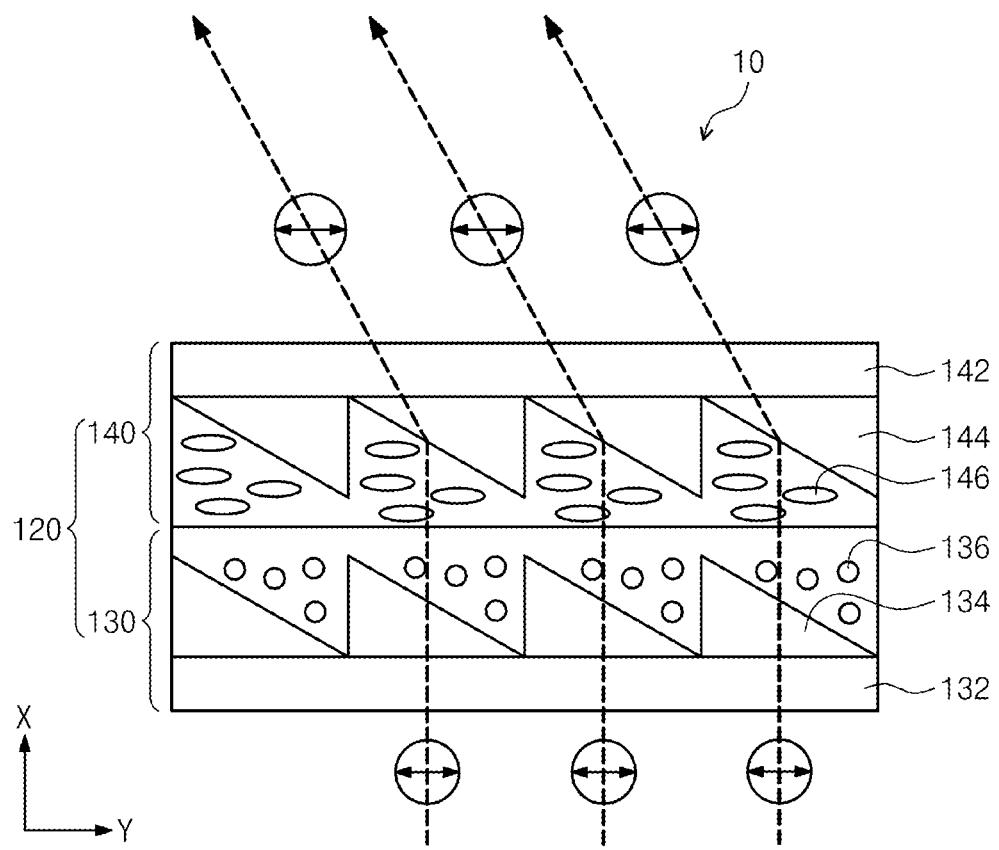
FIGS. 2 and 3 are cross-sectional views of a light steering device constituting a wide projection display system according to an embodiment of the present disclosure.
Figure 3:
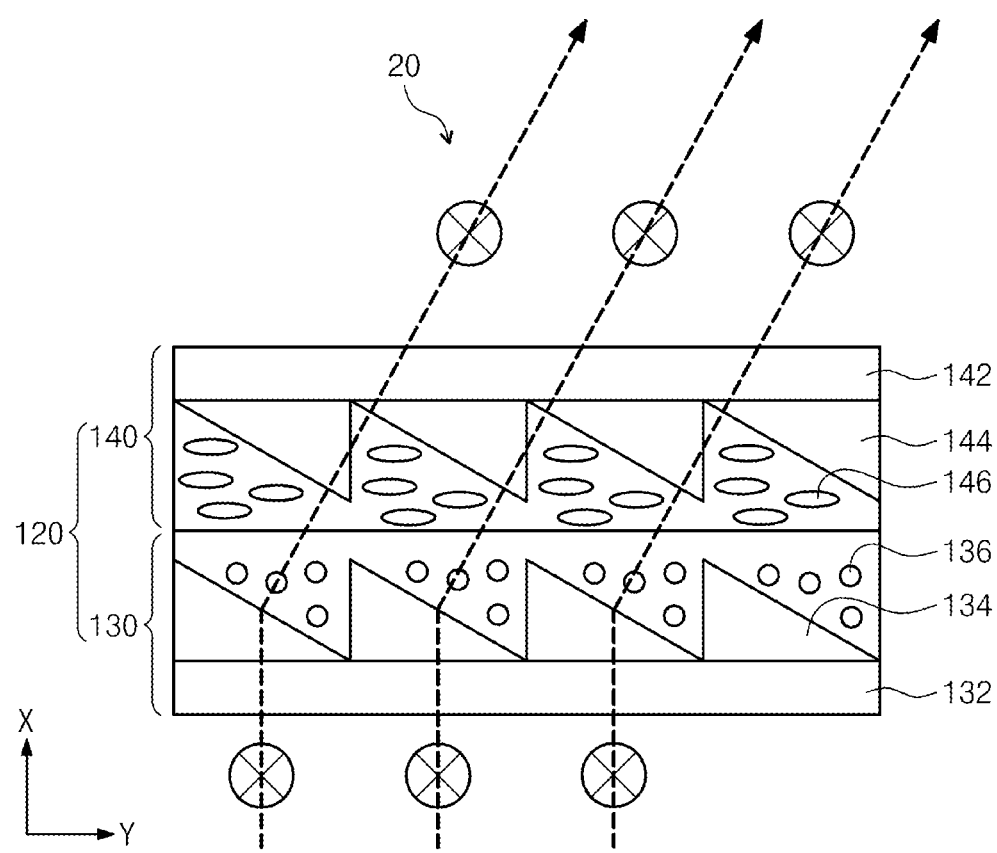

FIGS. 2 and 3 are cross-sectional views of a light steering device constituting a wide projection display system according to an embodiment of the present disclosure. FIG. 2 shows that the first image 10 is deflected in a first direction (for example, left direction) by the light steering device 120, and FIG. 3 shows that the image 20 is deflected in a second direction (for example, right direction).

FIGS. 1 to 3, the light steering device 120 comprises a plurality of Fresnel prism arrays 130 and 140 having polarization dependence. The plurality of Fresnel prism arrays 130 and 140 are stacked along the projection direction of images output from the projector 110. In order to implement a left/right symmetrical light divergence, the plurality of Fresnel prism arrays 130 and 140 comprise a first Fresnel prism array 130 and a second Fresnel prism array 140 stacked along a projection direction of images output from the projector 110.

Each of the Fresnel prism arrays 130 and 140 has a transparent substrate 132 and 142, a prism array 134 and 144 formed on the substrates 132 and 142, and a liquid crystal polymer layers 136 and 146 on the prism arrays 134 and 144 so as to have light anisotropy. In an embodiment, the prism arrays 134 and 144 may be provided with an isotropic polymer material. The liquid crystal alignment of the liquid crystal polymer layers 136 and 146 may be determined by reactive mesogen. The first and second Fresnel prism arrays 130 and 140 may be stacked on each other so that the liquid crystal polymer layers 136 and 146 contact each other.

The first and second Fresnel prism arrays 130 and 140 may turn on/off a function of a prism according to a polarization direction of incident light. If the refractive index of the isotropic polymer material of the prism arrays 134 and 144 is $n_p$, the refractive index of the alignment direction of birefringence medium of the liquid crystal polymer layers 136 and 146 is $n_e$, and the refractive index perpendicular to the alignment direction is $n_o$ of the liquid crystal polymer layers 136 and 146, then the refractive index relationship between the prism arrays 134 and 144 and the liquid crystal polymer layers 136 and 146 is $n_o = n_p < n_e$.

The polarization direction of the first image (Y direction) and the polarization direction of the second image (direction perpendicular to the XY plane) sequentially incident from the projector 110 to the light steering device 120 in a time-division scheme can be switched at high speed by a polarization switching unit (not shown). The polarization switching unit may be provided, for example, as a liquid crystal device in which liquid crystal alignment is controlled according to an electric field that changes every time-division period. The polarization switching unit may be provided in the projector 110 or may be provided in front of the first Fresnel prism array 130 of the light steering device 120.

According to the embodiments of FIGS. 2 and 3, the stacked first and second Fresnel prism arrays 130 and 140 have an arrangement symmetrical to each other in order to symmetrically diverge incident images left and right. The liquid crystal alignment directions of polymer layers 136 and 146 may be perpendicular to each other. The Fresnel prism arrays 130 and 140 may be provided in a structure in which triangular prisms are periodically arranged along the left and right directions (Y direction). The first and second Fresnel prism arrays 130 and 140 may have the same angle of refracting interface between the prism arrays 134 and 144 and the liquid crystal polymer layers 136 and 146 or may have different angles.

Illustratively, Fresnel prism arrays 130 and 140 having light anisotropy may be formed by forming the prism arrays 134 and 144 using a photo-curable isotropic polymer material based on the imprinting technology, and arranging a liquid crystal polymer material having birefringence in a single direction on the prism arrays.

When light enters the polarization-dependent Fresnel prism arrays 13 and 140 with the polarization direction of the incident light being perpendicular to the direction of the liquid crystal polymer layers 136 and 146, the birefringence medium has a refractive index of $n_o$. Accordingly, since the refractive index ($n_p$) of the isotropic polymer material of the prism arrays 134 and 144 and the refractive index ($n_o$) of the liquid crystal polymer layers 136 and 146 become the same, the incident light goes straight without refraction.

Conversely, when light enters the polarization-dependent Fresnel prism arrays 13 and 140 with the polarization direction of the incident light coinciding with the alignment direction of the liquid crystal polymer layers 136 and 146, the refractive index $n_e$ of the liquid crystal polymer layers 136 and 146 becomes larger than the refractive index ($n_p$) of the isotropic phase polymer material of the prism arrays 134 and 144. As a result, the incident light is refracted due to the difference in refractive index at the interface between the isotropic polymer layer and the liquid crystal polymer layer, and the path of light is bent by the Fresnel prism array. The same goes for even when light is incident on the projector 110 in a Lambertian form and a light steering function can be implemented according to the polarization direction of the light.

According to the embodiments of FIGS. 2 and 3, only one of the two Fresnel prism arrays 130 and 140 operates as a prism according to the polarization direction of incident light. For example, the first Fresnel prism array 130 passes the first image 10 polarized in the first polarization direction without deflecting. The second Fresnel prism array 140 deflects the first image toward the first region 32 of the screen 30. The first Fresnel prism array 130 deflects the second image 20 polarized in a second polarization direction perpendicular to the first polarization direction toward the second region 34 of the screen 30. The second Fresnel prism array 140 passes the second image 20 without deflecting.

For the images divided into left/right by the light steering device 120 and projected onto the screen 30 to accurately match with planes of the screen 30, the angles of the Fresnel prism arrays 130 and 140, the inclination angles of the prism array 134 and 144 are designed in consideration of the distance between the projector 110 and the screen 30, the projection image exit angle, and the distance between the projector 110 and the light steering device 120.

According to a wide projection display system according to an embodiment of the present disclosure, using a polarization-dependent light steering device, it is possible to realize a large screen image by increasing the size of the screen by 2 or 3 times or more without lowering the resolution compared to the conventional projection display by controlling the polarization direction of light in a time-division scheme to deflect the time-division images at high speed in the direction of left/right, left/right/front or top/bottom, etc. The projector 110 may project images in a time-division scheme at a high speed, for example, 120 Hz or higher speed so that the image viewer can visually recognize that the images projected on the screen are successive.

Figure 4:
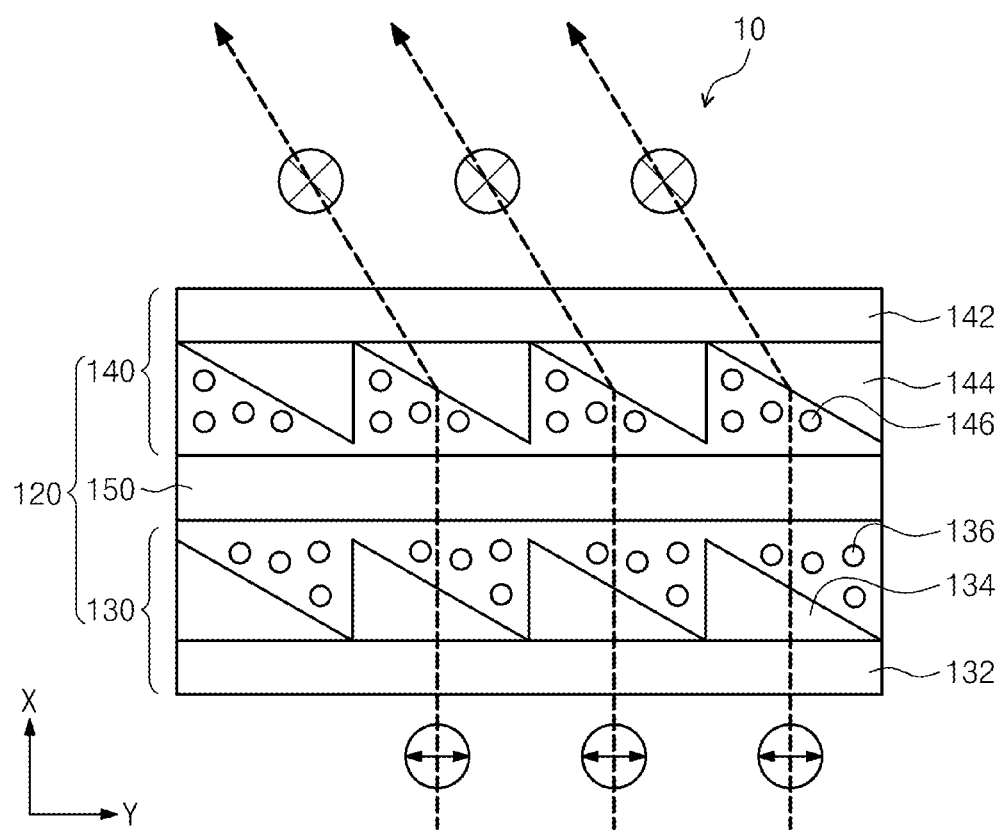
FIGS. 4 and 5 are cross-sectional views of a light steering device constituting a wide projection display system according to another embodiment of the present disclosure.
Figure 5:
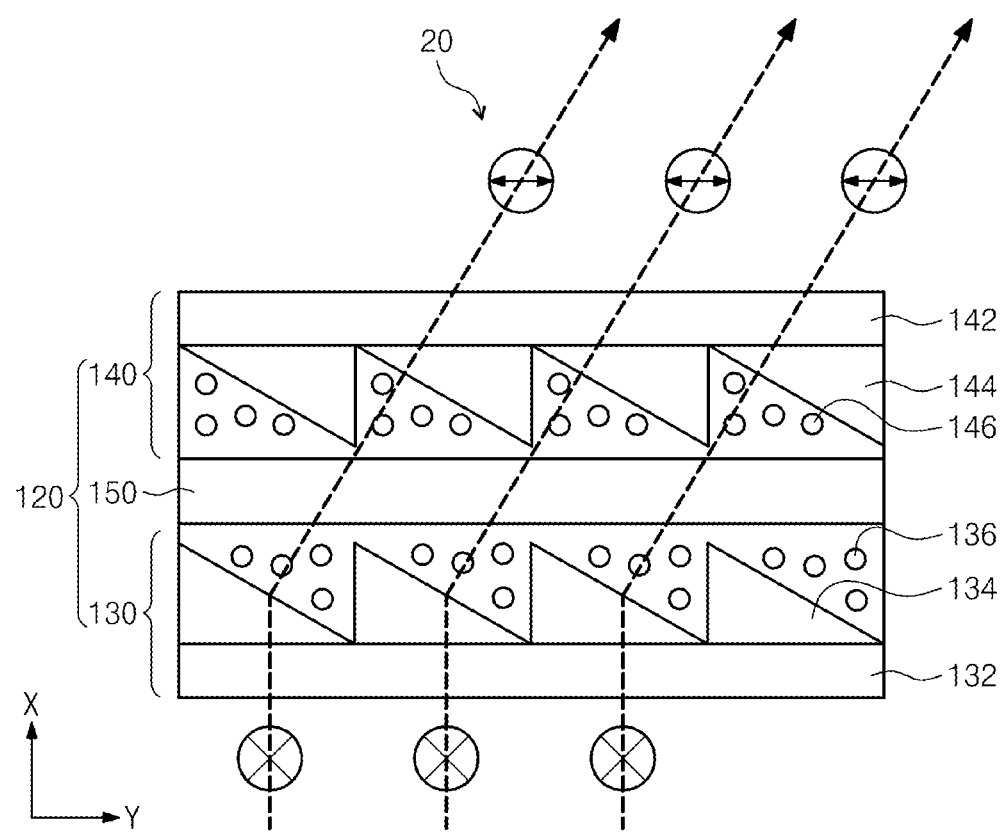

FIGS. 4 and 5 are cross-sectional views of a light steering device constituting a wide projection display system according to another embodiment of the present disclosure. In the embodiments shown in FIGS. 4 and 5, the first and second Fresnel prism arrays 130 and 140 have liquid crystal alignment directions of the liquid crystal polymer layers 136 and 146 aligned parallel to each other. Additionally, the light steering device 120 further comprises a half wave plate 150 that is stacked between the first and second Fresnel prism arrays 130 and 140.

The polarization-dependent Fresnel prism arrays 130 and 140, preferably, align the liquid crystals of the liquid crystal polymer layers 136 and 146 in the valley direction of the prism arrays 134 and 144 from the viewpoint of alignment of the liquid crystal polymer layers 136 and 146. When the liquid crystals of the liquid crystal polymer layers 136 and 146 are aligned in the vertical direction of the prism arrays 134 and 144, a shadow effect may occur due to the prism array structure, and in this case, the degree of alignment may decrease near the deepest valley. Additionally, the effective refractive index value may vary at the interface due to the inclined structure of the prism arrays 134 and 144.

The half wave plate 150 may change the polarization direction of images by 90°. That is, the half-wave plate 150 converts X linearly-polarized light into Y linearly-polarized light, and converts Y linearly-polarized light into X linearly-polarized light. Of the two Fresnel prism arrays 130 and 140, only one Fresnel prism array operates as a prism according to the polarization direction of incident light, thereby implementing a light steering function.

Figure 6:
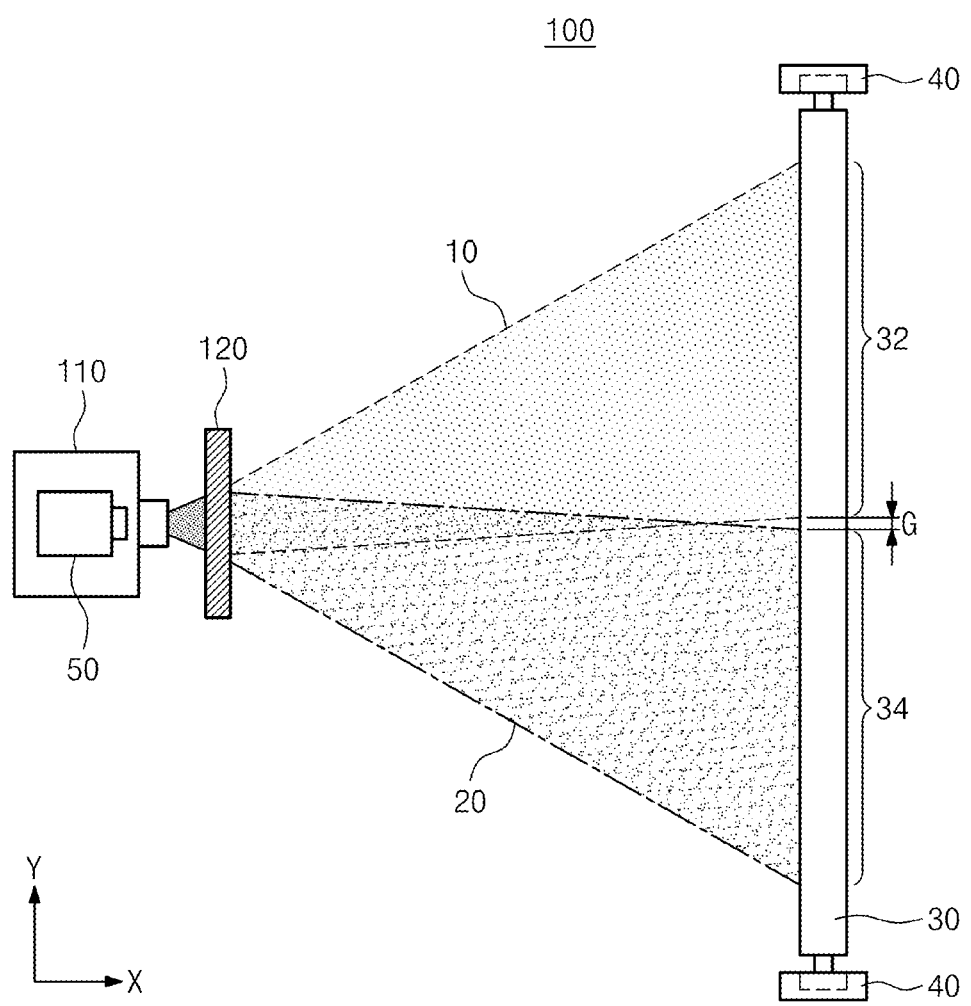
FIG. 6 is a schematic view of a wide projection display system according to another embodiment of the present disclosure.
Figure 7:
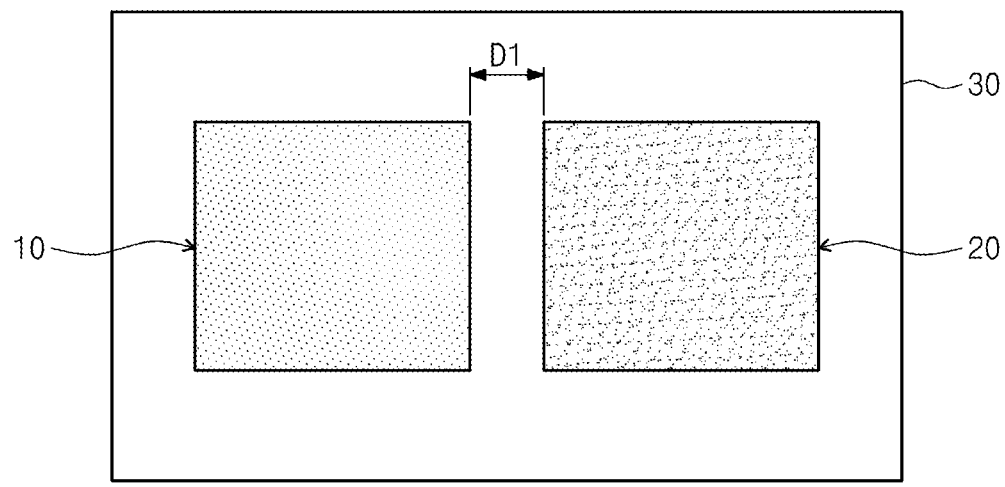
FIGS. 7 to 9 are views for explaining an operation of an analysis unit constituting a wide projection display system according to the embodiment of FIG. 6.
Figure 8:
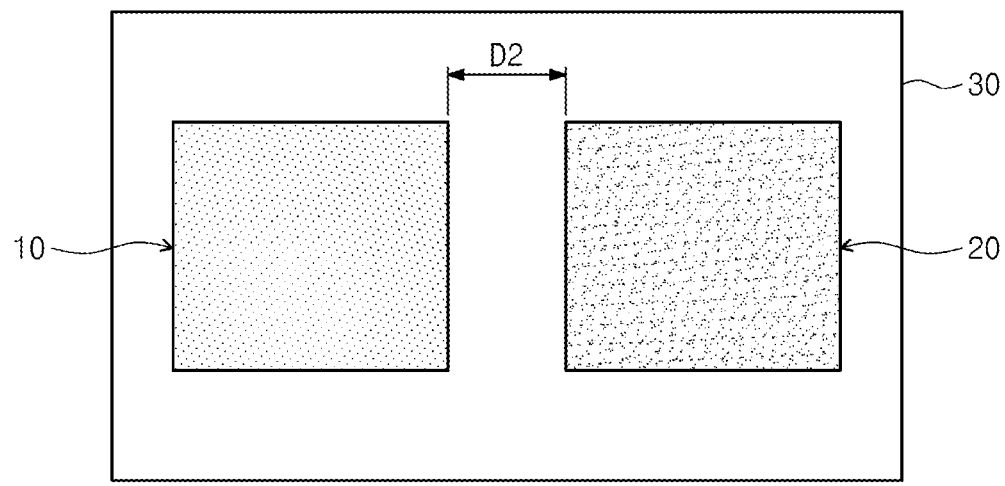
Figure 9:
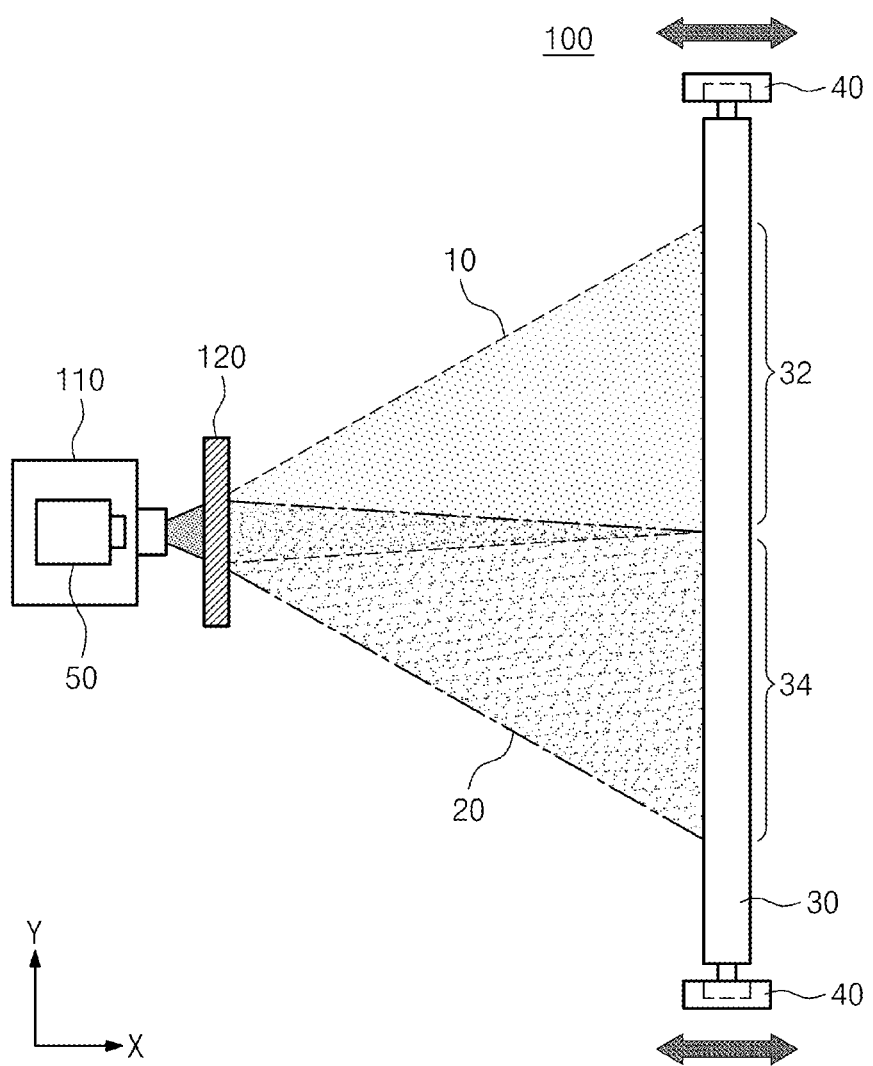

FIG. 6 is a schematic view of a wide projection display system according to another embodiment of the present disclosure. FIGS. 7 to 9 are views for explaining an operation of an analysis unit constituting the wide projection display system according to the embodiment of FIG. 6. Referring to FIGS. 6 to 9 the wide projection display system 100 may further comprise an analysis unit 50 and a screen driving unit 40.

The images projected in a time-division scheme and divided into the left/right by the light steering device 120 form one image frame. Thus, the boundary of the images projected on the screen 30 should be connected naturally to be recognized as one image frame. So, even if the prism of the polarization-dependent Fresnel prism array is designed and manufactured by considering the exit angle of the projector 110, the distance between the projector 110 and the screen 30, and the distance between the projector 110 and the light steering device 120, errors may occur when implementing the actual system.

In order to solve this problem, the analysis unit 50 analyzes an overlapping region of images projected on the screen 30 by the light steering device 120 or a separation distance between images projected on the screen 30 by the light steering device. A correction pattern image may be used to determine the screen position. The correction pattern image is divided into a first image 10 and a second image 20 and projected in a time-division scheme by the projector 110, and the projected first image 10 and the second image 20 are projected on the left and right regions of the screen 30 by the light steering device 120.

The analysis unit 50 may calculate the overlapping region (overlapping interval, size) of the first image 10 and the second image 20 or a separation distance between the first image 10 and the second image 20 by capturing the first image 10 and the second image 20 projected on the screen 30, processing the captured images and comparing the intervals between the correction patterns. If the first image 10 and the second image 20 are projected on a correct position on the screen 30 without an overlapping region or separation distance, the correction patterns as shown in FIG. 7 are spaced apart by a first interval D1.

When a second interval D2 between the correction patterns is greater than the first interval D1 between the correction patterns, the analysis unit 50 may determine that the first image 10 and the second image 20 are spaced apart from each other by a distance proportional to the difference value between the second interval D2 and the first interval D1. Conversely, when the second interval D2 between the correction patterns is smaller than the first interval D1 between the correction patterns, the analysis unit 50 determines that the first image 10 and the second image 20 are overlapped by a distance proportional to the difference between the second interval D1 and the first interval D2.

When an overlapping region or a separation distance between the first image 10 and the second image 20 projected on the screen 30 by the analysis unit 50 is calculated, the screen driving unit 40 controls the position of the screen 30 according to the size of the overlapping region or the separation distance. The screen driving unit 40 may be provided to move the screen 30 in the light projection direction, and a driving method of moving the screen 30 is not particularly limited.

As shown in FIG. 6, when a separation region G is formed between the images 10 and 20 projected on the screen 30, the screen driving unit 40 move the screen 30 forward toward the projector 110 according to the separation distance calculated by the analysis unit 50. Conversely, when an overlapping region is formed between the images 10 and 20 projected on the screen 30, the screen driving unit 40 moves the screen 30 backward away from the projector 110 according to the overlapping distance calculated by the analysis unit 50.

After the screen 30 is moved by the screen driving unit 40, the analysis unit 50 once again determine whether the images 10 and 20 projected on the screen 30 are overlapped or separated. When the images are overlapped or separated, the position of the screen 30 is controlled by the screen driving unit 40. When the position of the boundaries between the images 10 and 20 is accurately matched by repeatedly performing such process, as shown in FIG. 9, the position setting of the screen 30 is completed.

Figure 10:
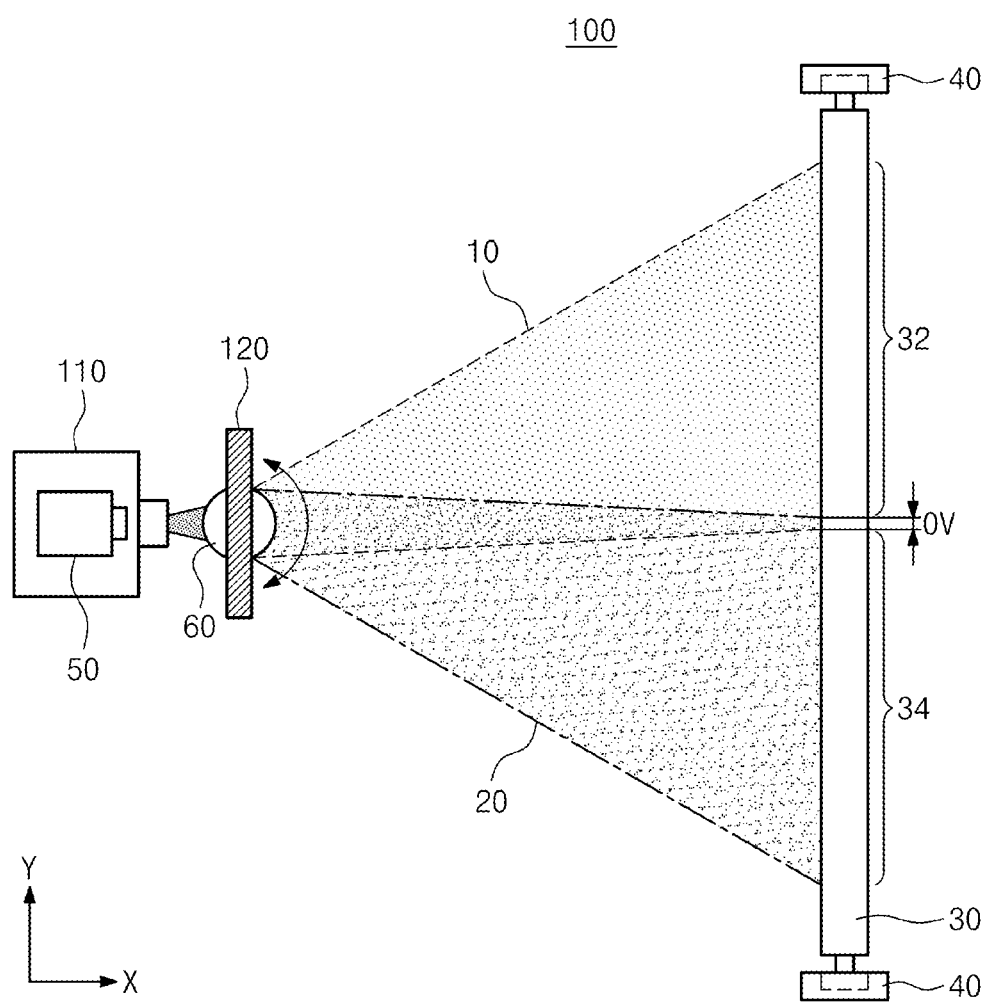
FIG. 10 is a schematic view of wide projection display system according to another embodiment of the present disclosure.

FIG. 10 is a schematic view of a wide projection display system according to another embodiment of the present disclosure. FIGS. 11 to 14 are views for explaining an operation of a first driving unit constituting the wide projection display system according to the embodiment of FIG. 10. Referring to FIGS. 10 to 14, the wide projection display system 100 further comprises a first driving unit 60.

The first driving unit 60 controls the orientation of the light steering device 120 with respect to the projection direction of images output from the projector 110. The first driving unit 60 may control the orientation of the light steering device 120 so that the images 10 and 20 projected on the screen 30 by the light steering device are not separated from each other and are not overlapped with each other. The first driving unit 60 may be provided as a means such as a driving motor or a driving cylinder that rotates the light steering device 120 around a vertical axis, but is not limited thereto. Whether the images 10 and 20 are overlapped or separated may be determined in the same scheme by the analysis unit 50 described above.

Figure 11:
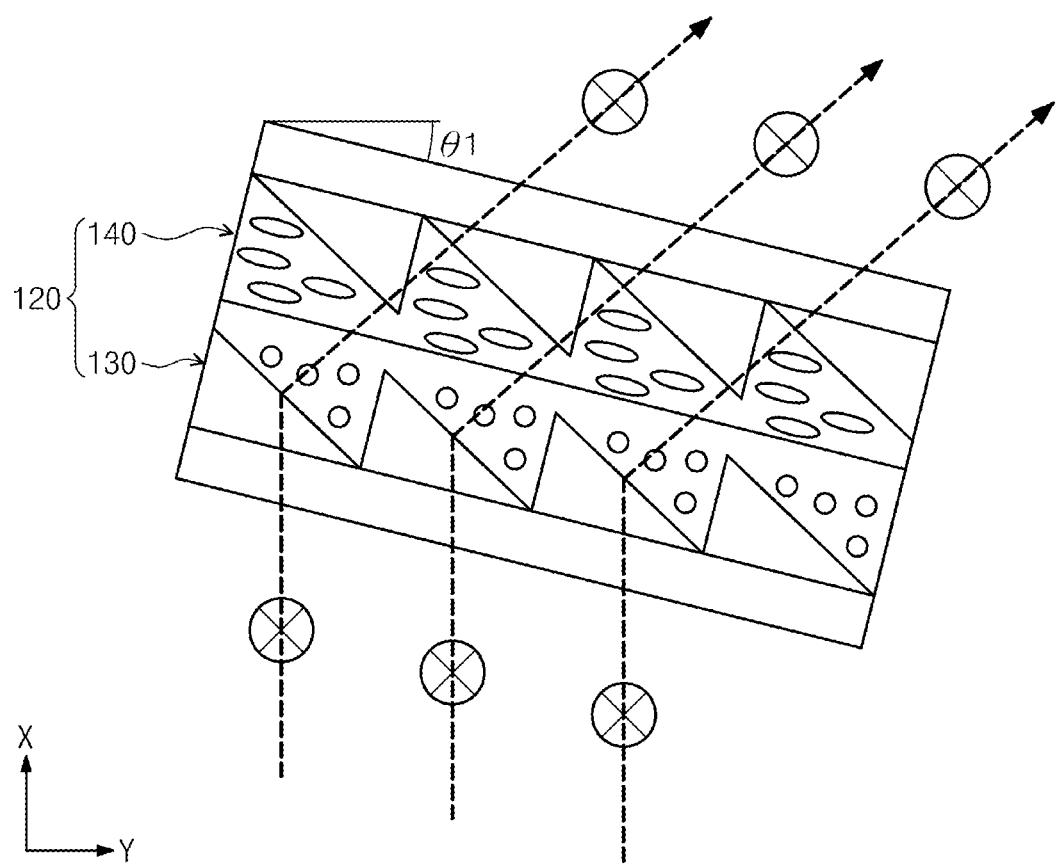
FIGS. 11 to 14 are views for explaining an operation of a first driving unit constituting the wide projection display system according to the embodiment of FIG. 10.
Figure 12:
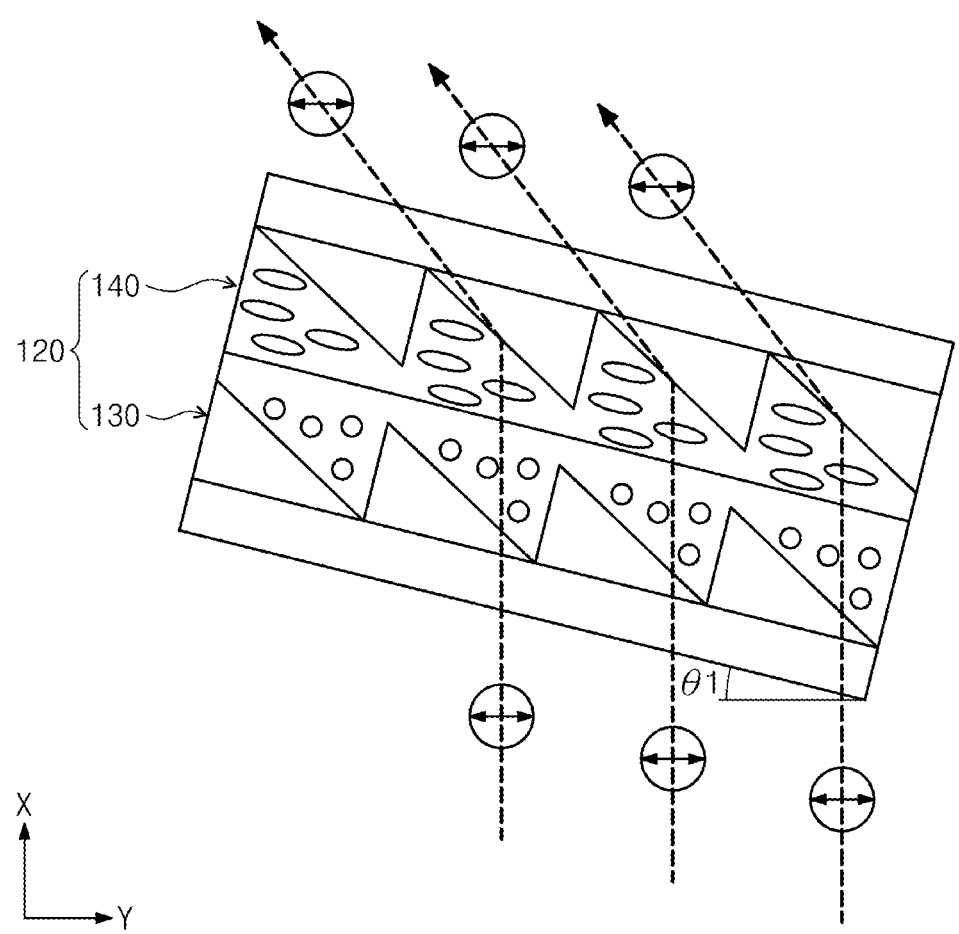
Figure 13:
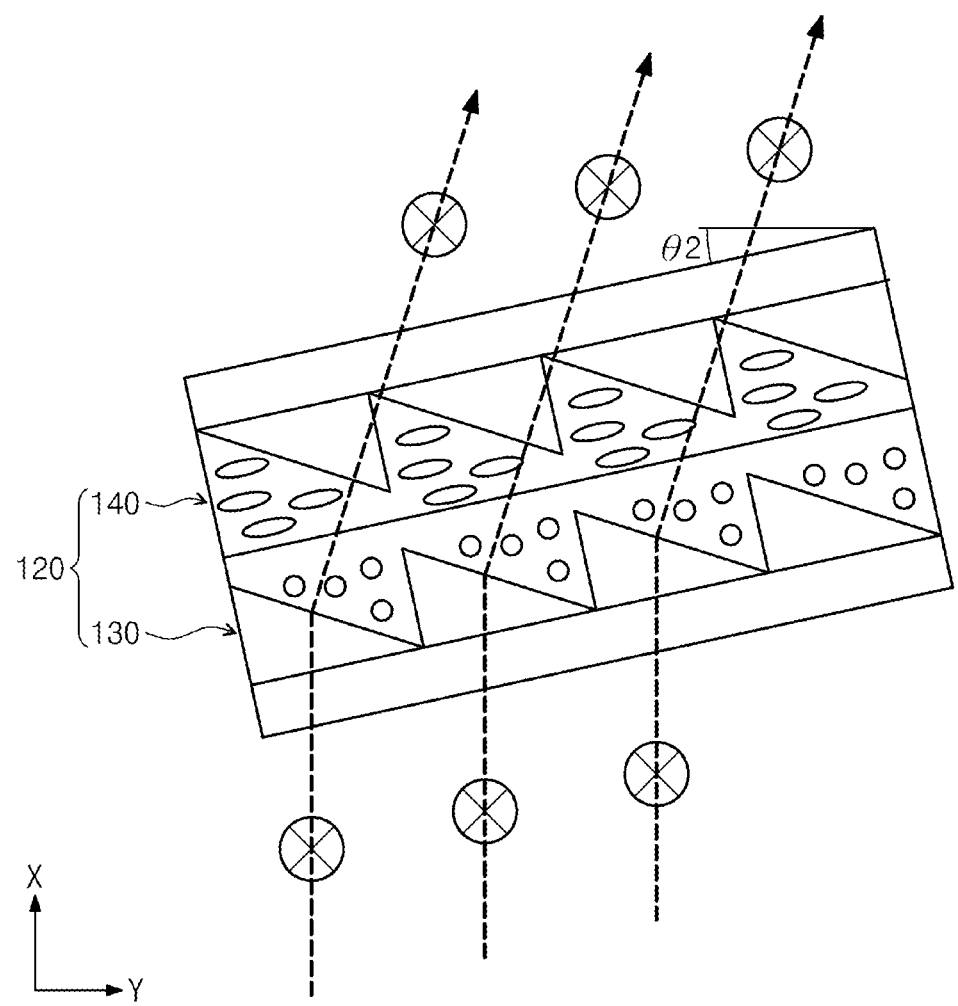
Figure 14:
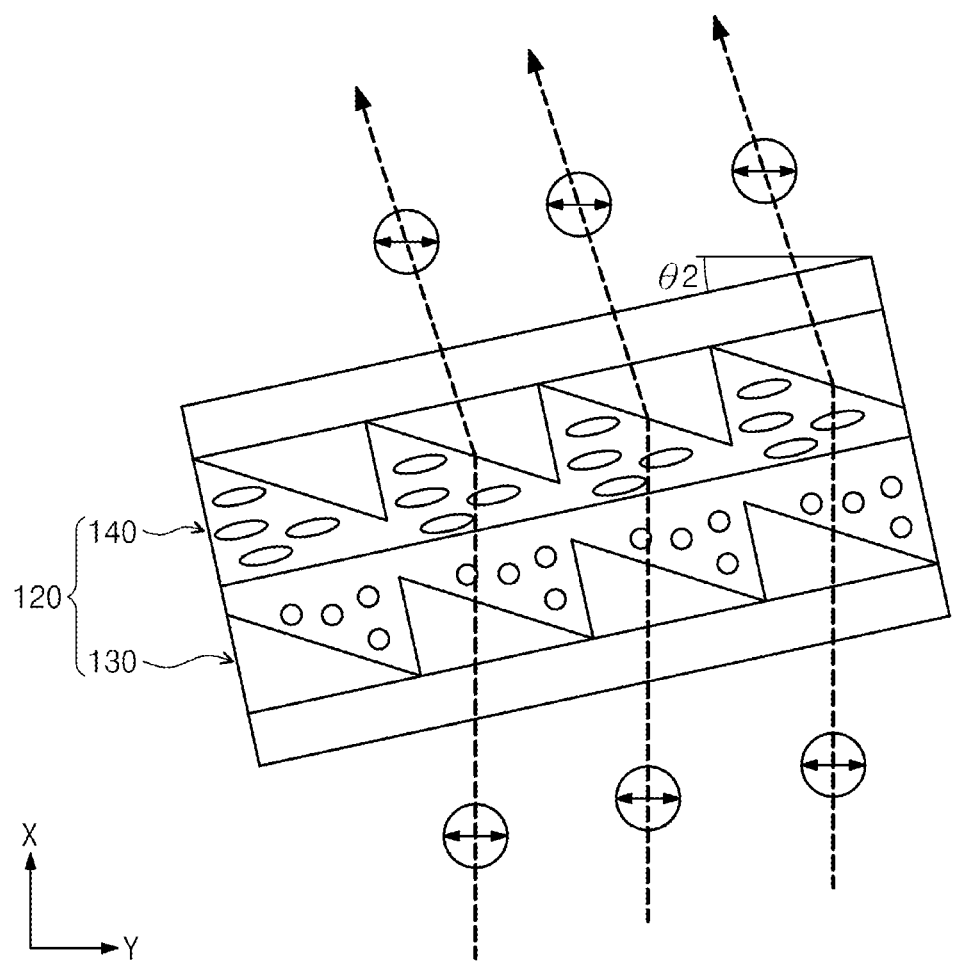

For example, when there is an overlapping region (OV) between the images 10 and 20 divided into the left/right due to a small refraction angle of the images 10 and 20, as shown in FIGS. 11 and 12, the refraction angle may be increased by tilting the light steering device 120 by an inclination angle θ1, thereby further tilting the prism array refracting interface of the light steering device 120. Conversely, when the images 10 and 20 divided into the left/right are spaced apart from each other due to a large refraction angle of the images 10 and 20, as shown in FIGS. 13 and 14, the refraction angle may be decreased by tilting the light steering device 120 by an inclination angle θ2 in the opposite direction of FIG. 11 and FIG. 12, thereby further tilting the prism array refracting interface of the light steering device 120.

FIGS. 15 to 18 are views of showing a light steering device constituting a wide projection display system according to another embodiment of the present disclosure. The embodiments of FIGS. 15 to 18 further comprise a second driving unit 70 for controlling an angle between the first and second Fresnel prism arrays 130 and 140. The second driving unit 70 controls the angle between the first and second Fresnel prism arrays 130 and 140 so that images projected on the screen by the light steering device 120 are not spaced apart from each other and are not overlapped with each other.

In the shown embodiment, the second driving unit 70 comprises a driving system (for example, a driving cylinder) capable of controlling the length between both ends of the first and second Fresnel prism arrays 130 and 140. As long as the angle between the first and second Fresnel prism arrays 130 and 140 can be controlled, the driving method of the second driving unit 70 is not particularly limited. Whether the images are overlapped or separated may be determined in the same scheme by the analysis unit described above.

Figure 15:
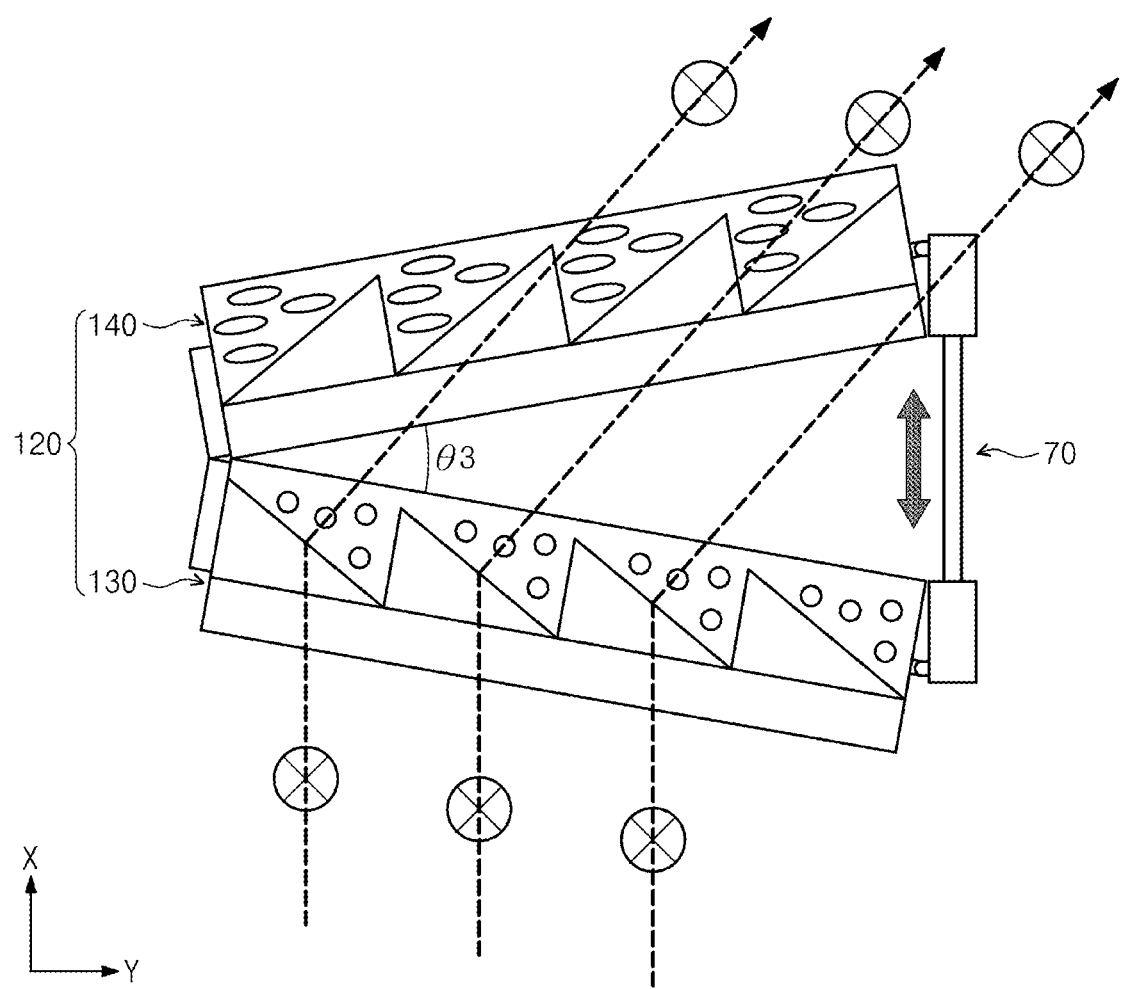
FIGS. 15 to 18 show a light steering device constituting a wide projection display system according to another embodiment of the present disclosure.
Figure 16:
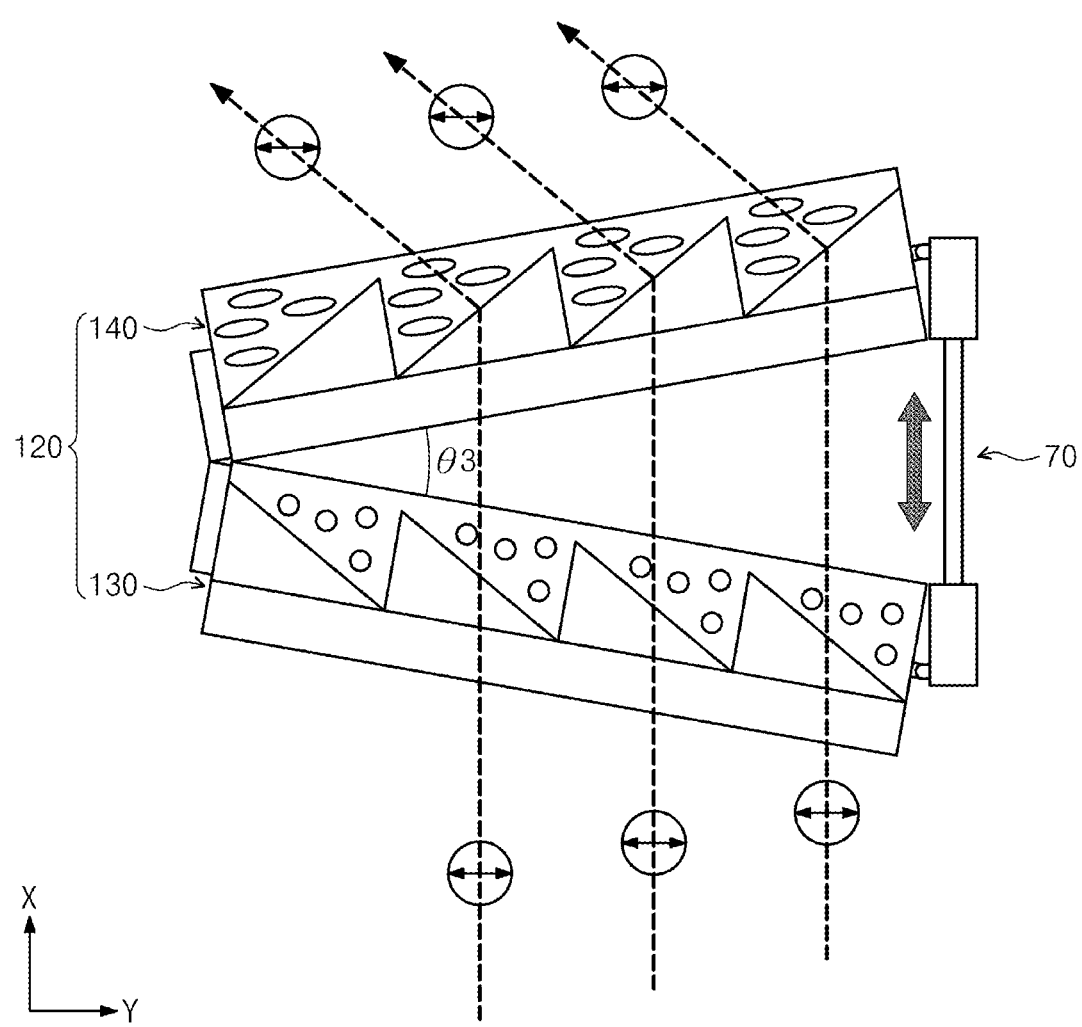
Figure 17:
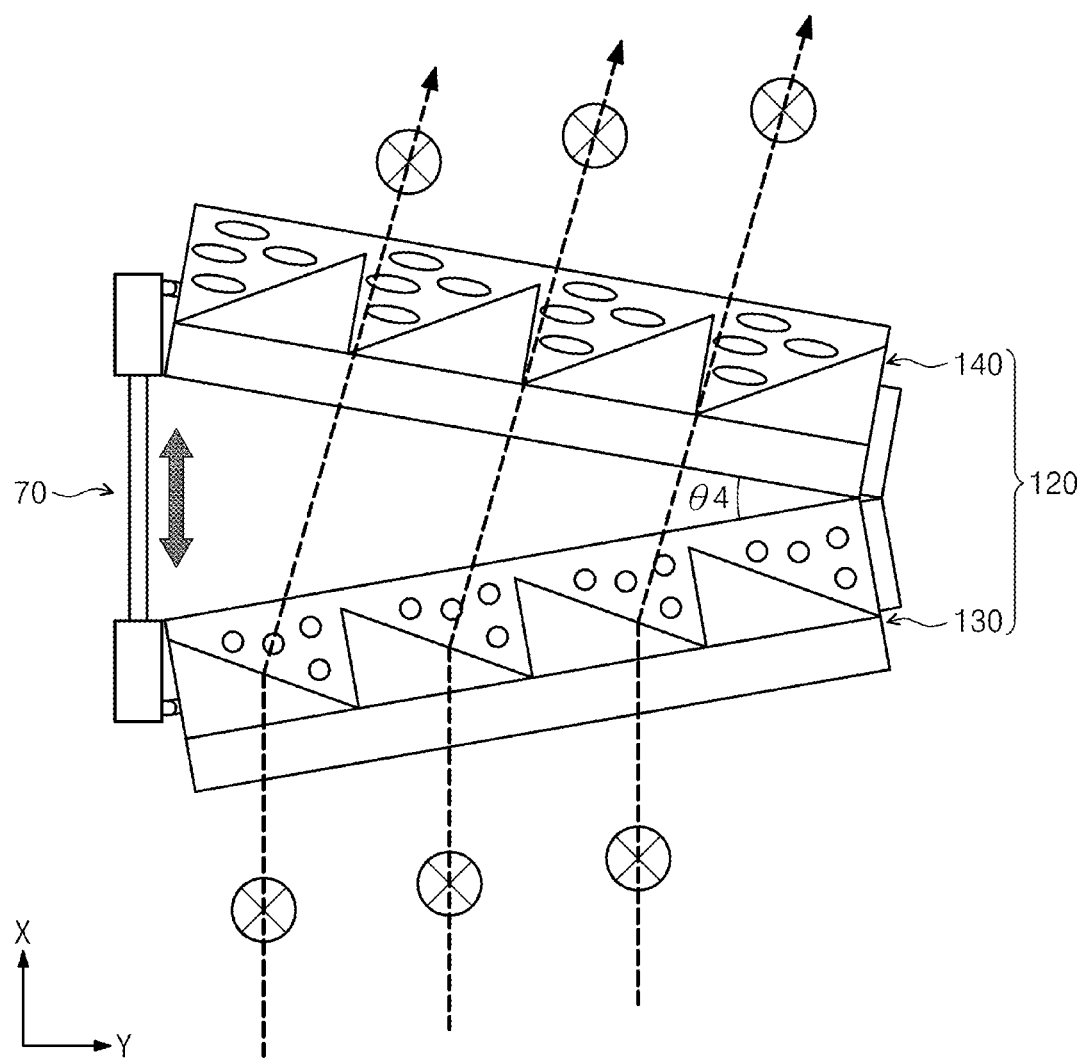
Figure 18:
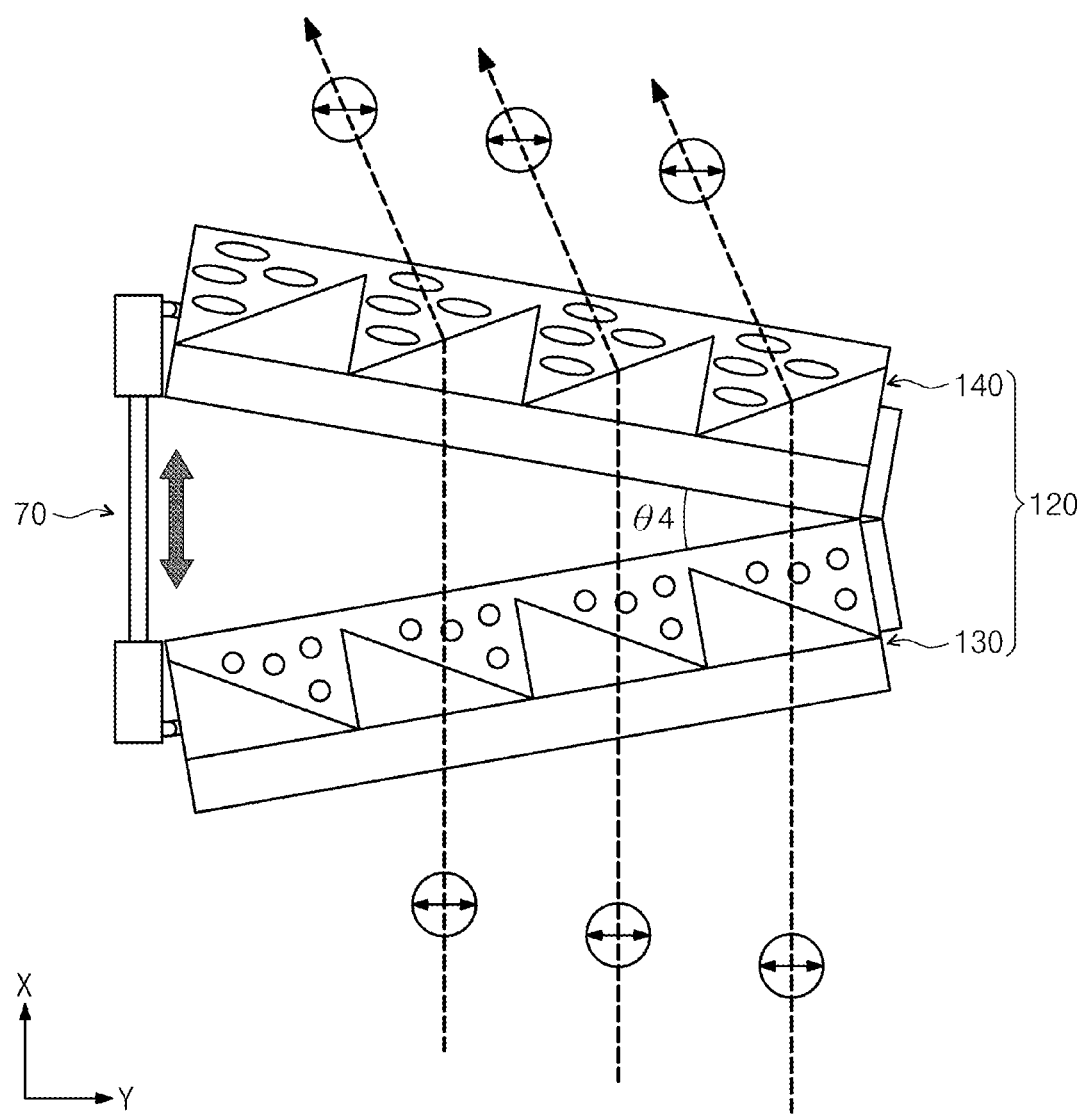

For example, when the refraction angle of the images is small and the images divided to the left and right are overlapped in the center of the screen, the refraction angle may be increased by tilting the first and second Fresnel prism arrays 130 and 140 by an inclination angle θ3 to the right, thereby increasing the difference in inclination angles between the refracting interfaces of the first and second Fresnel prism arrays 130 and 140, as shown in FIGS. 15 and 16. Conversely, when the images divided to the left/right are separated from each other due to a large refraction angle of the images, the refraction angle may be reduced by tilting the first and second Fresnel prism arrays 130 and 140 by an inclination angle θ4 to the right, thereby reducing the difference in the inclination angle between the refracting interfaces of the first and second Fresnel prism arrays 130 and 140, as shown in FIGS. 17 and 18. According to an embodiment of the present disclosure, the exit angle can be controlled by tilting the polarization dependent Fresnel prism arrays applied to the wide projection display system, and accordingly, the position of each divided image can be finely controlled to implement a natural wide image.

Figure 19:
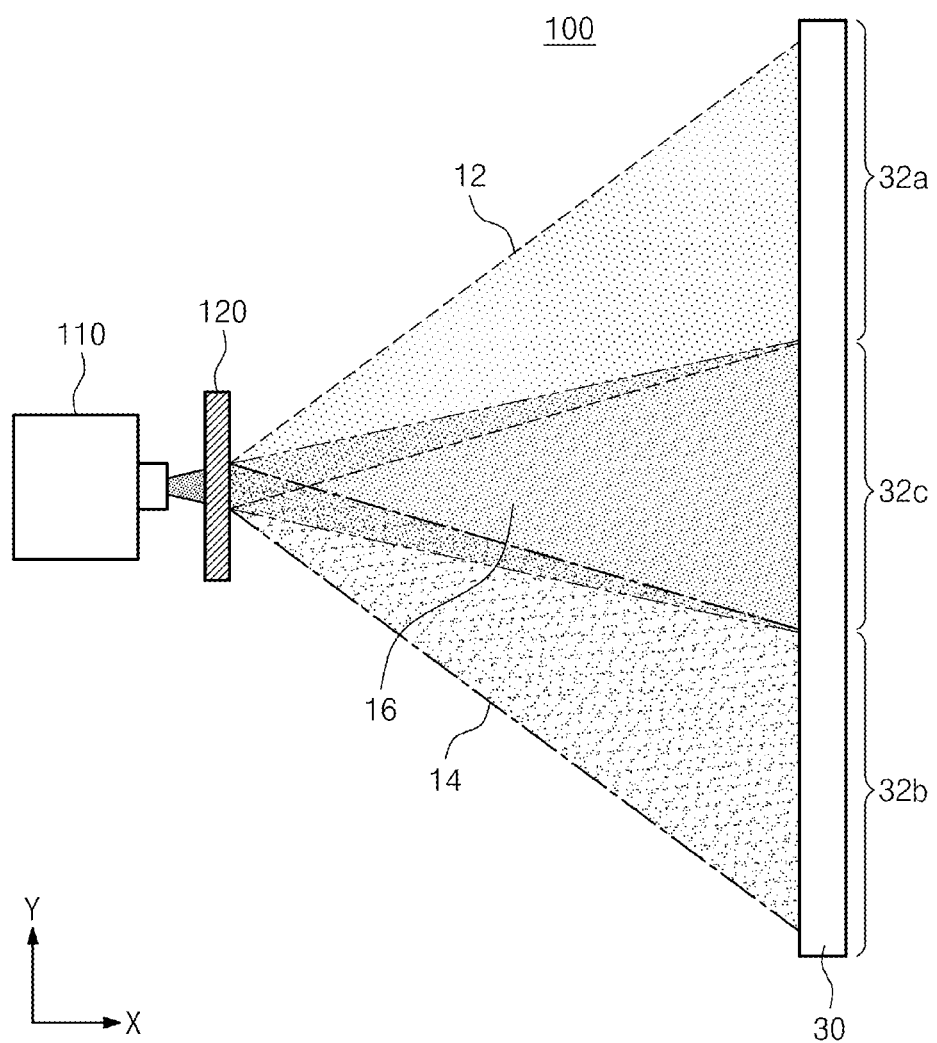
FIG. 19 is a schematic view of a wide projection display system according to another embodiment of the present disclosure.
Figure 20:
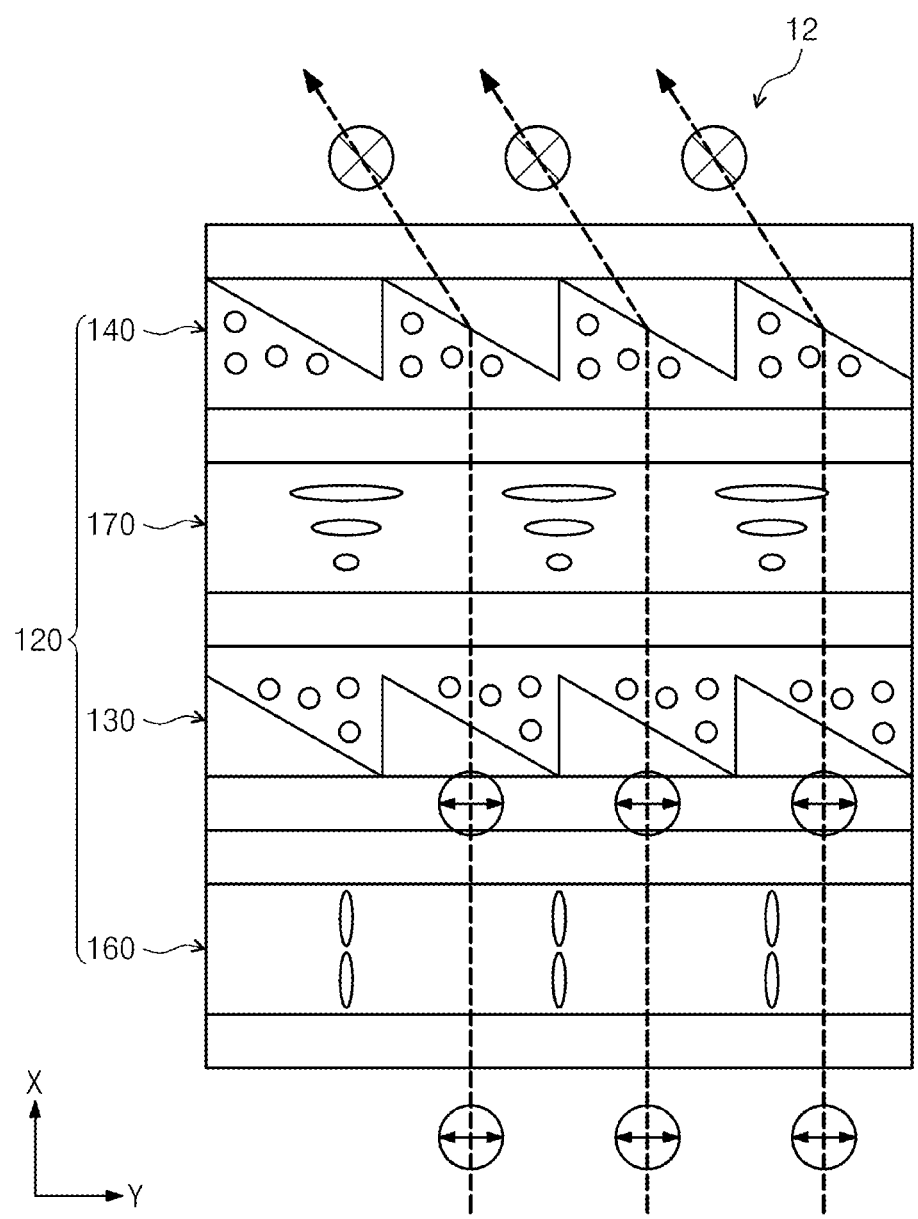
FIGS. 20 to 22 are cross-sectional views showing a light steering device constituting the wide projection display system according to the embodiment of FIG. 19.
Figure 21:
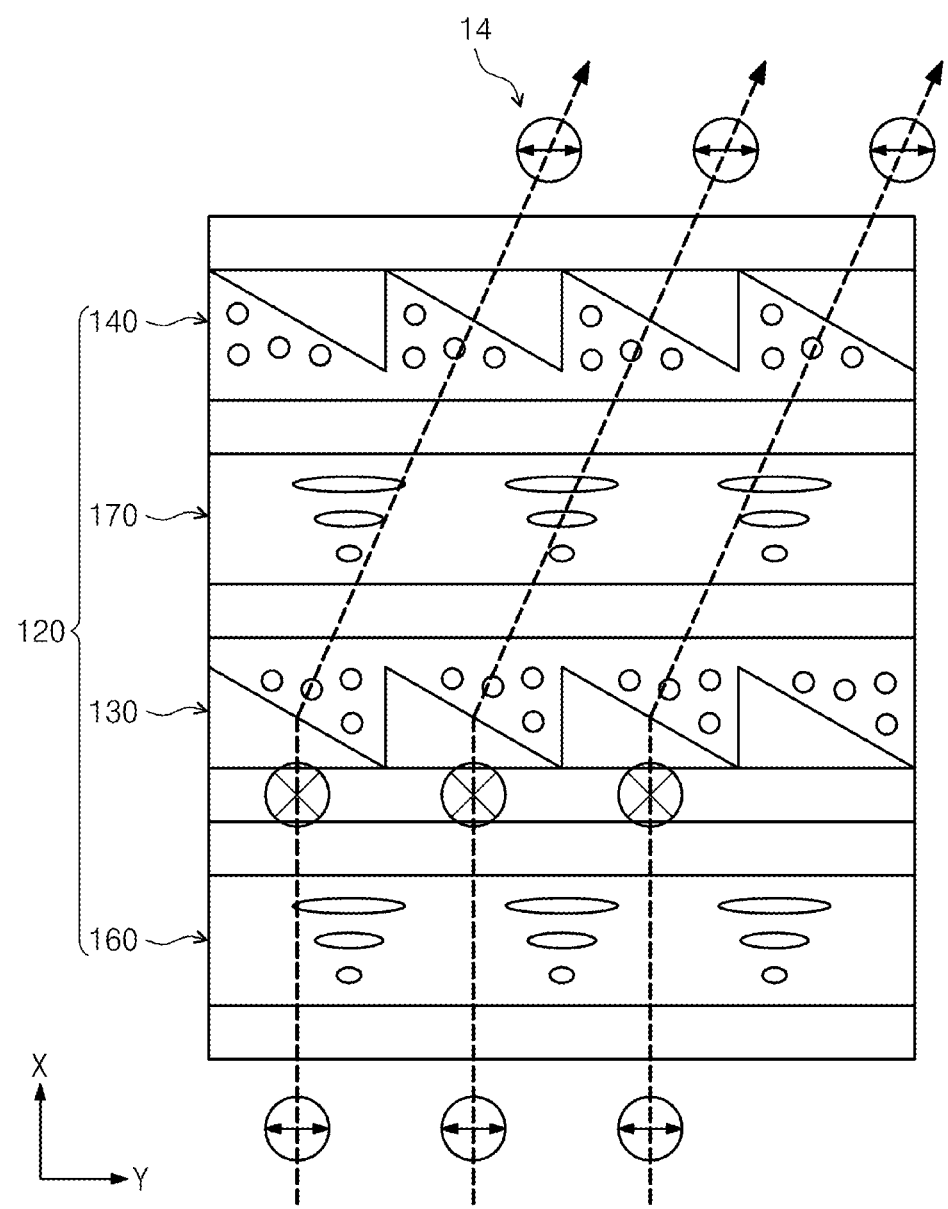
Figure 22:
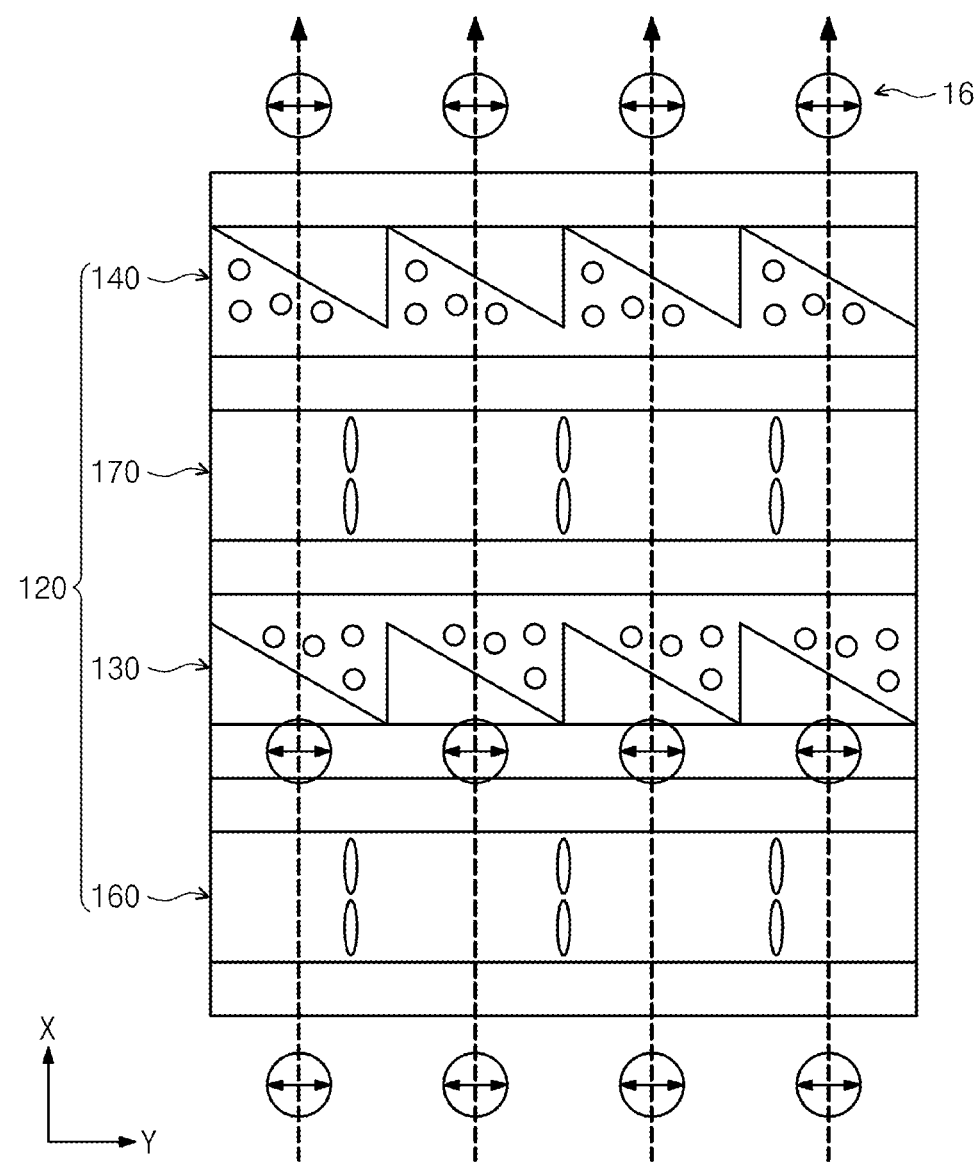

FIG. 19 is a schematic view of a wide projection display system according to another embodiment of the present disclosure. FIGS. 20 to 22 are cross-sectional views of showing a light steering device constituting the wide projection display system according to the embodiment of FIG. 19. Referring FIGS. 19 to 22, the light steering device 120 may comprise a first polarization control layer 160, a first Fresnel prism array 130, a second polarization control layer 170 and a second Fresnel prism array 140 sequentially stacked along a projection direction of images projected from the projector 110.

The first polarization control layer 160 selectively changes the polarization direction of the images 12, 14, and 16 by 902 according to a first control signal (for example, voltage). The first Fresnel prism array 130 controls the projection direction of the images 12, 14, 16 according to the polarization direction of the images 12, 14, 16. The second polarization control layer 170 selectively changes the polarization direction of the images 12, 14, and 16 by 90° according to the second control signal. The second Fresnel prism array 140 controls the projection direction of the images 12, 14, 16 according to the polarization direction of the images 12, 14, 16.

The first polarization control layer 160 and the second polarization control layer 170 may comprise a liquid crystal layer in which liquid crystal alignment is changed by an electric field. The first polarization control layer 160 and the second polarization control layer 170 have electrodes formed on the front and rear surfaces, respectively. By controlling the electric field applied between the front and rear electrodes of the first and second polarization control layers 160 and 170, respectively and controlling the liquid crystal alignment of the first and second polarization control layers 160, the images 12, 14, 16 can be selectively deflected according to the polarization direction of the images 12, 14, 16.

According to the embodiments of FIGS. 19 to 22, a polarization switching layer is interposed between two polarization dependent Fresnel prism arrays 130 and 140 that are structurally symmetric and have the same direction of the liquid crystal polymer, thereby controlling on/off of the respective Fresnel prism array. As the upper/lower Fresnel prism arrays 130 and 140 alternately operate as a prism, the left/right divided images 12 and 14 can be obtained. And when the two Fresnel prism arrays 130 and 140 are not operated, the front image 16 can be obtained. In order to sequentially and quickly project left/right/front images, the two polarization control layers 160 and 170 are synchronized with each other to control the polarization states of the Fresnel prism arrays 130 and 140.

In the shown example, the first image 12 is deflected in a first direction by the second Fresnel prism array 140 and is projected on the left region 32a of the screen 30, and the second image 14 is deflected in a second direction by the first Fresnel prism array 130 and is projected on the right region 32b of the screen 30. The third image 160 may be projected on the central region 32c of the screen 30 without being deflected by the first and second Fresnel prism arrays 130 and 140. The left region 32a, the right region 32b, and the central region 32c may be regions that are not spaced apart from each other and are not overlapped with each other.

According to the embodiments of FIGS. 19 to 22, incident images may be symmetrically divided into three parts left/right/front by the polarization control layer that is stacked between the stacked polarization dependent Fresnel prism arrays. Left/Right/Front images 12, 14, 16 are sequentially and rapidly projected on the regions 32a, 32b, 32c of the screen 30 to display the same resolution as the conventional projection display system while increasing the size of the screen by 3 times.

In the above, embodiments in which the size of the screen is expanded in the left/right direction by controlling the projection direction of images in the left/right or left/right/front directions has been described. However, it is also possible to change the orientation of the light steering device to expand the size of the screen in other directions such as up-down directions.

In the wide projection display system according to the embodiment of the present disclosure, two or more images are separated by a light steering device and projected in different directions in a high-speed time-division scheme using one projector. By doing so, a large screen may be implemented without lowering the resolution with only one projector. The wide projection display system according to an embodiment of the present invention may be applied, for example, to a virtual reality experience center or a large screen movie theater.

It should be understood that the aforementioned embodiments have been presented to help the understanding of the present disclosure, and do not limit the scope of the present disclosure, and various modified embodiments therefrom are also within the scope of the present disclosure. Therefore, the technical protection scope of the present invention will be defined by the technical spirit of the appended claims. and the technical protection scope of the present disclosure is not a literal description of all embodiments of the disclosure, but it should be understood that the scope extends to the disclosure that has substantially equal technical value.

What is claimed is:

1. A wide projection display system, comprising:
   a projector that sequentially outputs images to be projected on different regions of a screen in a time-division scheme: and
   a light steering device installed at a rear of the projector and controlling output directions of the images differently according to polarization directions of the images,
   wherein the light steering device comprises a plurality of Fresnel prism arrays having polarization dependence and stacked along a projection direction of images output from the projector.

2. The wide projection display system of claim 1, wherein the Fresnel prism array comprise a prism array and a liquid crystal polymer layer on the prism array.

3. The wide projection display system of claim 2, wherein the plurality of Fresnel prism arrays comprise a first and a second Fresnel prism arrays stacked along the projection direction of the images and the first and second Fresnel prism arrays have liquid crystal alignment directions of the liquid crystal polymer layer perpendicular to each other.

4. The wide projection display system of claim 3, wherein the first Fresnel prism array passes a first image polarized in a first polarization direction of the images without deflecting, and the second Fresnel prism array deflects the first image toward a first region of the screen.

5. The wide projection display system of claim 4, wherein the first Fresnel prism array deflects a second image polarized in a second polarization direction perpendicular to the first direction of the images toward a second region of the screen, and the second Fresnel prism array passes the second image without deflecting.

6. The wide projection display system of claim 5, wherein the first region and the second region are not spaced apart from each other and are not overlapped with each other.

7. The wide projection display system of claim 6, wherein the first region is a left region of the screen and the second region is a right region of the screen.

8. The wide projection display system of claim 2, wherein the plurality of Fresnel prism arrays comprise a first and a second Fresnel prism arrays stacked along the projection direction of the images and the first and second Fresnel prism arrays have liquid crystal alignment directions of the liquid crystal polymer layer parallel to each other, the light steering device comprises a half-wave plate between the first and second Fresnel prism arrays and the half-wave plate changes the polarization direction of the images by 90°.

9. The wide projection display system of claim 2, wherein the light steering device comprises:
   a first polarization control layer for selectively changing a polarization direction of the images by 90° according to a first control signal;
   a first Fresnel prism array stacked on the first polarization control layer and controlling a projection direction of the images according to the polarization direction of the images;
   a second polarization control layer stacked on the first Fresnel prism array and selectively changing a polarization direction of the images by 90° according to a second control signal; and
   a second Fresnel prism array stacked on the second polarization control layer and controlling a projection direction of the images according to the polarization direction of the images.

10. The wide projection display system of claim 9, wherein the first polarization control layer and the second polarization control layer may comprise a liquid crystal layer in which liquid crystal alignment is changed by an electric field.

11. The wide projection display system of claim 9, wherein a first image of the images is deflected in a first direction by the second Fresnel prism array and is projected on a left region of the screen, a second image of the images is deflected in the second direction by the first Fresnel prism array and is projected on a right region of the screen, a third image of the images is projected on a central region of the screen without defecting by the first and second Fresnel prism arrays and the left, right, and the central regions are not spaced apart from each other and are not overlapped with each other.

12. The wide projection display system of claim 1, further comprising:
   an analysis unit for analyzing an overlapping region of images projected on the screen by the light steering device or a separation distance between images projected on the screen by the light steering device; and
   a screen driving unit for controlling a position of the screen according to a size of the overlapping region or the separation distance.

13. The wide projection display system of claim 1, further comprising a driving unit for controlling an orientation of the light steering device with respect to the projection direction of the images output from the projector.

14. The wide projection display system of claim 13, wherein the driving unit controls the orientation of the light steering device so that images projected on the screen by the light steering device are not spaced apart from each other and are not overlapped with each other.

15. The wide projection display system of claim 1, wherein the plurality of Fresnel prism arrays comprise a first and a second Fresnel prism arrays arranged along the projection direction of the images and the system further comprises a driving unit for controlling an angle between the first and second Fresnel prism arrays.

16. The wide projection display system of claim 15, wherein the driving unit controls an angle between the first and second Fresnel prism arrays so that images projected on the screen by the light steering device are not spaced apart from each other and overlapped with each other.

* * * * *